United States Patent

Waynik et al.

[11] Patent Number: 5,541,406
[45] Date of Patent: Jul. 30, 1996

[54] PULSED OPERATION OF OPTICAL ROTARY ENCODER FOR LOW-POWER APPLICATIONS

[75] Inventors: Jeffrey M. Waynik, Nederland; Ralph D. Wieland, Broomfield, both of Colo.

[73] Assignee: Ohmeda Inc., Liberty Corner, N.J.

[21] Appl. No.: 313,515

[22] Filed: Sep. 26, 1994

[51] Int. Cl.⁶ .................................................. G01D 5/34
[52] U.S. Cl. ........................... 250/231.14; 250/231.18
[58] Field of Search .............................. 250/232, 233, 250/231.13, 231.18, 231.14

[56] References Cited

U.S. PATENT DOCUMENTS

| | | | |
|---|---|---|---|
| 3,096,444 | 4/1958 | Seward | 250/233 |
| 3,576,441 | 4/1971 | Adams | 250/231.13 |
| 4,033,883 | 7/1977 | Zinsmeyer et al. | 250/231.14 |
| 4,078,485 | 3/1986 | Guthrie | 250/233 |
| 4,631,940 | 12/1986 | Krivec et al. | |
| 4,634,859 | 1/1987 | Martell | 250/231.11 |
| 5,070,238 | 12/1991 | Ishihara et al. | 250/231.13 |

*Primary Examiner*—Georgia Y. Epps
*Assistant Examiner*—Jacqueline M. Steady
*Attorney, Agent, or Firm*—Roger M. Rathbun; Larry R. Cassett; James M. Graziano

[57] ABSTRACT

The pulsed optical rotary encoder digitally samples the operation of the optical rotary encoder to obtain the same information that is obtained by the use of the continuously active light-emitting devices but in a much more energy-efficient manner. In particular, the light-emitting devices are pulsed into operation for a short duration and at a frequent rate. The signals produced by the light detectors associated with the light-emitting devices are sampled at a predetermined time after firing the light-emitting devices to obtain the data necessary to determine the rotation of the coding disk.

8 Claims, 3 Drawing Sheets

PULSED OPERATION OF OPTICAL ROTARY ENCODER FOR LOW-POWER APPLICATIONS

FIELD OF THE INVENTION

This invention relates to a user interface device for electronic instruments and in particular to a low-power mode of operation used therein.

PROBLEM

It is a problem in the field of electronic instruments to make the instrument sufficiently accurate to perform the required measurements and yet be inexpensive enough for the particular assigned task. A further complication is introduced when the instrument is portable, which adds the requirements that the instrument be compact in size and operate on battery power for an extended period of time. In this application, the conservation of battery power represents a critical parameter, and the design of the instrument must be such that power is not squandered in performing unnecessary tasks or tasks in a manner that is energy inefficient. It is therefore highly desirable in the field of portable electronic instruments, such as monitoring instruments, to implement the various functions in an energy efficient manner, while also minimizing cost, size and weight, yet without sacrificing data quality. The use of energy conservation measures that do not have ramifications in terms of sacrificing quality, adding significant additional weight or size or cost to the measurement system therefore represent significant improvements in the design of portable monitoring instruments.

In pulse oximeters and other medical monitoring instruments, high-power light emitting devices are used for a variety of purposes. One specific application of light emitting devices is their use in a rotary encoder, which produces an indication of the direction, speed and magnitude of the rotation of a control knob on the medical monitoring instrument. The rotary encoder typically consists of a chopper disk that has a plurality of openings formed therein, which disk is coaxially attached to the same shaft as the knob or dial that is turned by the user. When the user turns the knob, the shaft and its attached chopper disk rotate and interrupt the light beam that emanates from the light-emitting device whenever the solid portion of the coding disk is in the path of the light beam. Thus, by monitoring the frequency of interruptions to the light beam, the magnitude and speed of rotation of the knob can be directly measured. By using a pair of light-emitting devices the direction of rotation can also be determined. A difficulty with this apparatus is that light-emitting devices consume a significant amount of power since they are powered on at all times. Therefore, the rotary pulse encoder is an economical and reliable device to enable a user to control the operation of the monitoring instrument, but it is a significant consumer of energy in a battery-powered device.

SOLUTION

The above-described problems are solved and a technical advance achieved in the field by the pulsed optical rotary encoder of the present invention. The pulsed optical rotary encoder digitally samples the operation of the optical rotary encoder to obtain the same information that is obtained by the use of the continuously active light-emitting devices but in a much more energy-efficient manner. In particular, the light-emitting devices are pulsed into operation for a short duration and at a frequent rate. The signals produced by the light detectors associated with the light-emitting devices are sampled at a predetermined time after firing the light-emitting devices to obtain the data necessary to determine the rotation of the chopper disk. This apparatus is highly accurate and reliable while consuming only a fraction of the power normally consumed by an optical rotary encoder. The frequency of operation of the light-emitting devices must be selected to eliminate aliasing to thereby unambiguously detect the presence of each aperture in the encoding disk as it is rotated by the user.

DETAILED DESCRIPTION

In electronic equipment, an interface must be provided to enable the user to input data to the equipment. This function is generally implemented by the use of a shaft-mounted knob, which shaft is also connected to some form of transducer. As the user rotates the knob in either direction, the rotary motion of the shaft causes the transducer element to generate a signal indicative of the shaft's position, direction of rotation and, optionally, speed of rotation. For continuously variable input settings, a continually varying transducer device, such as a variable resistor, is typically used to translate the shaft rotation into an electronic signal. The resistance of the transducer element is either increased or decreased as a function of the direction of motion of the shaft and the magnitude of resistance is indicative of the shaft position. Another type of data input device is the multi-position rotary switch which enables the user to select one of a plurality of functions by rotating the knob to select the desired function. Mechanical detentes are typically used to provide tactile feedback to the user and to accurately position the shaft at predetermined set points. A mechanical multi-position rotary switch can therefore be used as a transducer element, but this requires the use of electrical contacts for each of the set point positions. A problem with electrical contacts is that they wear, generate noise as they are activated and deactivated, and represent a fairly expensive implementation of the transducer element.

Optical Rotary Encoder

Figure 1:
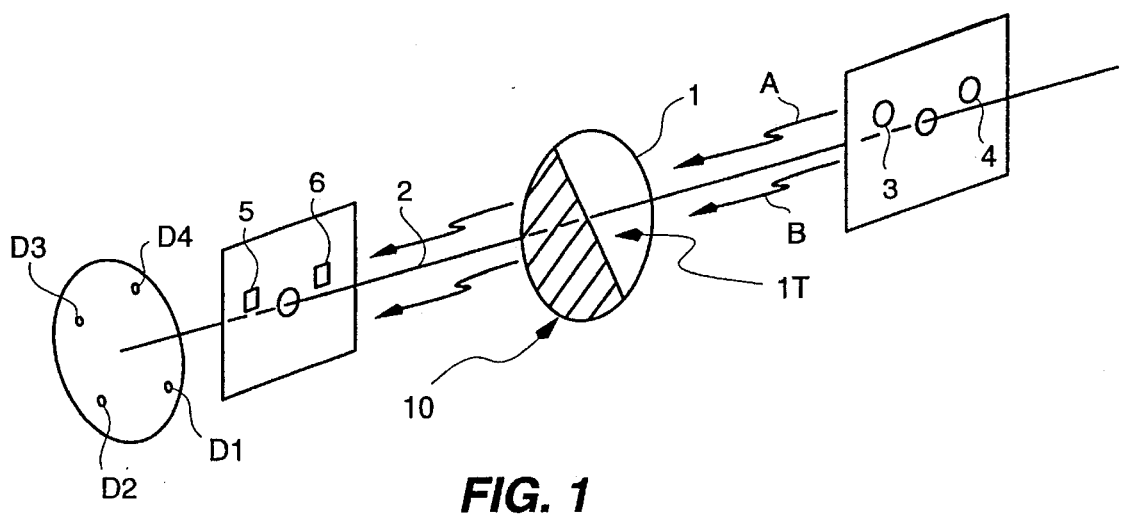
FIGS. 1 and 2 illustrate one embodiment of the apparatus of the present invention.

A more efficient transducer element is an optical rotary encoder which makes use of electronic elements to sense the rotary position and motion of the shaft. The optical rotary encoder is illustrated in FIG. 1. The basic optical rotary encoder is typically implemented by affixing a chopper disk 1 to a shaft 2, which disk 1 is manufactured of an optically opaque material and which includes at least one light transmissive section 1T formed therein. The optically transmissive sections 1T can be apertures formed in a disk-like structure or the chopper disk 1 can be formed of a plurality of separate optically opaque sections 1O that project radially from a hub affixed to shaft 2. In either case, the resultant structure is termed "disk" herein for simplicity of description. The chopper disk 1 therefore consists of alternating sections of optical transmissivity and optical opacity. A plurality of detentes D1-Dn can be provided to precisely define a plurality of positions of the shaft that correspond to a like plurality of user input selections, with the mechanical feedback provided by the detentes enabling the user to position the shaft in a selected one of the plurality of positions. The number of detentes are selected as a function of the number of alternating opaque/transmitting sections of chopper disk, such that each detented position corresponds to an identifiable pattern of light beam transmission/blocked.

One or more light-emitting devices 3, 4 with corresponding light detectors 5, 6 are installed such that the light beams A and B generated by the light-emitting devices 3, 4 are transmitted to the corresponding light detectors 5, 6 along a path that is parallel to and substantially juxtaposed to the shaft 2. The paths of the two generated light beams A, B are traversed by the chopper disk 1. Thus, the two transmitted light beams A, B are alternately interrupted and passed by the corresponding opaque 1O and transmissive 1T sections of the chopper disk 1 as the chopper disk 1 is rotated via the rotation of shaft 2. As the shaft 2 is rotated and the chopper disk 1 rotates coaxially therewith, the sequence of transmissive 1T and opaque 1O sections of chopper disk 1 cause the light detectors 5, 6 to sense the presence/absence of the light beams A, B transmitted by the light-emitting devices 3, 4. The light detectors 5, 6 produce signals indicative of the presence/absence of one of the opaque sections 1O of the chopper disk 1 being present opposite the corresponding one of light-emitting devices 3, 4. By tracking the sequence of light detector outputs, the control circuit 7 can determine the position of the shaft 2. The use of two light-emitting device/light detector combinations, enables determination of not only the position of the shaft 2, but also the direction of rotation of shaft 2. This is accomplished by placing the light-emitting devices 3, 4 in an offset arrangement such that when the shaft 2 is rotated in a first direction, the apertures formed in the chopper disk 1 pass the light beam A generated by the first light-emitting device 3 immediately prior to passing the light beam B generated by the second light-emitting device 4. When the shaft 2 is rotated in the opposite direction, the chopper disk 1 passes the light beam B generated by the second light-emitting device 4 prior to passing the light beam A generated by the first light emitting device 3. Therefore, the order of light beam transmission is indicative of the direction of rotation of the shaft 2 while the presence or absence of the light beams A, B at the two light detectors 5, 6 is indicative of the position of the shaft 2 and the frequency at which the apertures pass in front of the two light beams A, B is indicative of speed of rotation of the shaft 2.

Figure 3:
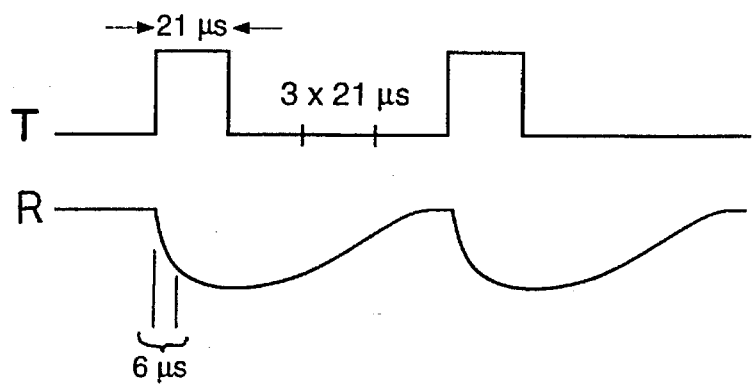
FIGS. 3–8 illustrate timing and waveform diagrams to illustrate the operation of the apparatus of FIGS. 1 and 2.
Figure 4:
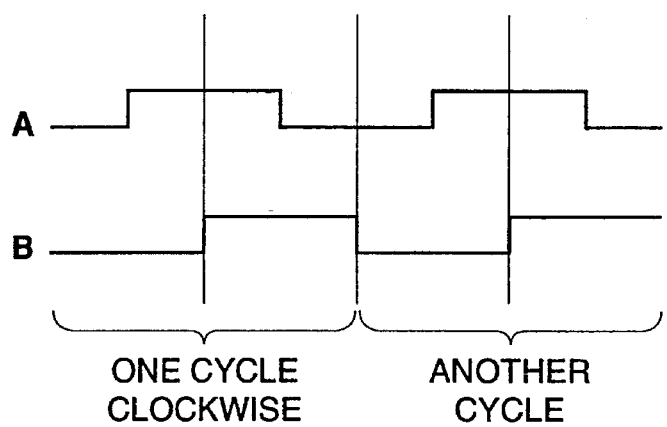

The operation of the rotary optical encoder can better be understood by reference to the waveform diagrams of FIGS. 3–8. The waveform illustrated in FIG. 3 is indicative of the generic timing of the rotation of the chopper disk 1 with respect to the path of light beams A and B as illustrated in FIG. 1. Thus, as shaft 2 rotates, chopper disk 1 alternately blocks/passes the respective light beams A, B. The positioning of the light emitting devices 3, 4 and light detectors 5, 6 are such that the sequence of light beam blocking/passing of light beam A is staggered with respect to light beam B.

Therefore, this optical rotary encoder configuration can sense the position of the shaft 2 as well as the direction and speed of rotation thereof without requiring the use of electrical contacts which are a common source of failure in electronic equipment. A difficulty with this arrangement however is that the pair of light-emitting devices 3, 4 consumes a significant amount of power to generate light beams of sufficient intensity to be accurately detected by the light detectors 5, 6. This typically does not represent a significant problem since ample power is generally available in a monitoring instrument to provide the required drive signal. In the field of portable monitoring instruments, conservation of energy is a significant design criteria and the use of an optical rotary encoder represents a significant drain on the batteries used to power the portable monitoring instrument and reduces the operational life thereof. As an alternative, the use of electrical switch contacts in a portable instrument is also typically undesirable since the portable monitoring instrument is operated in areas where significant sources of switch contact contamination are typically present in the ambient environment and would quickly interfere with the operation of electrical switch contacts.

Power Conservation

Figure 2:
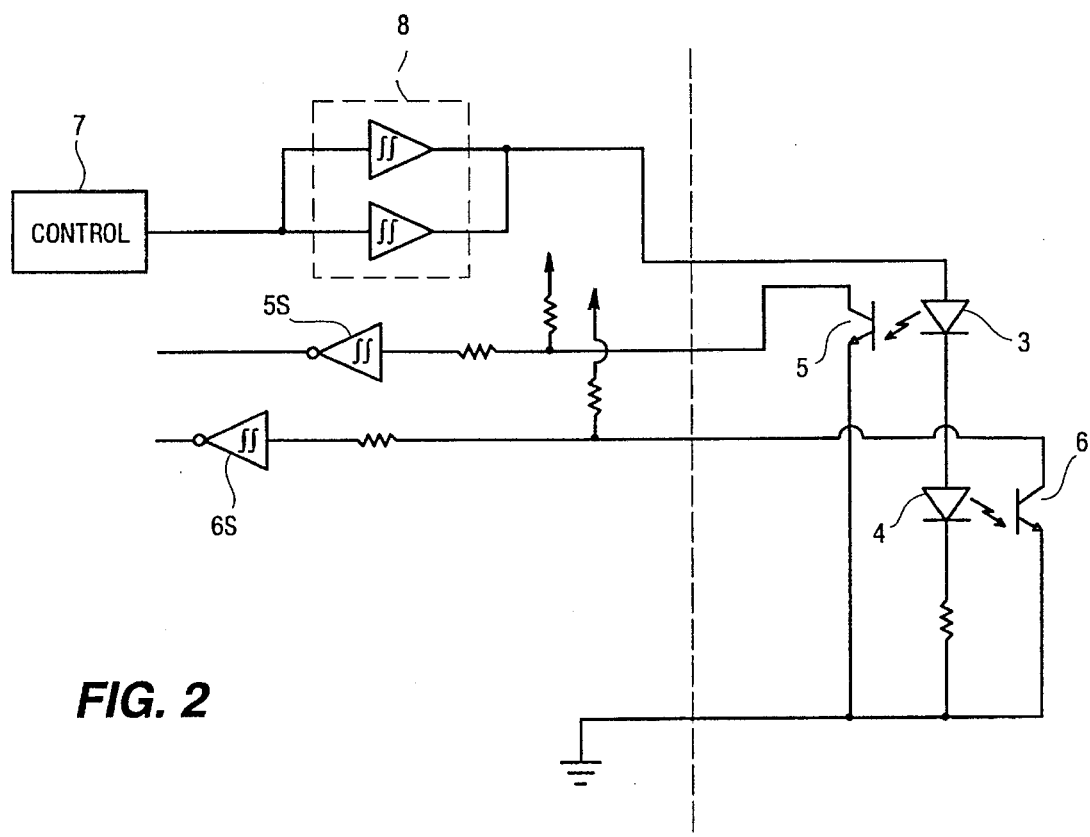

The pulsed optical rotary encoder apparatus of the present invention solves the power consumption problem of optical rotary encoders by implementing a digitally sampled optical rotary encoder that requires only a fraction of the power that optical encoders with continuously operating light-emitting devices would normally require. The control circuit 7 illustrated in FIG. 2 includes a pulse generation capability that significantly reduces power consumption.

The light-emitting devices 3, 4 are typically high power light emitting diodes, each of which emit a focused beam of light of either predetermined wavelength or a spectrum of wavelengths. The light detectors 5, 6 are devices, such as phototransistors, that can detect the presence of the light beams A, B produced by light-emitting diodes 3, 4 and which generate electrical signals in response to the receipt of the light beams A, B, the magnitude of these electrical signals being proportional to the intensity of the received light beams A, B. Control circuit 7 includes digital pulse generator circuit 8, which produces a current that powers the two light-emitting diodes 3, 4 to produce the respective beams of light A, B. The pulse repetition frequency is selected to avoid aliasing problems, with a minimum frequency of twice the maximum likely rotation speed of chopper disk 1. The selection of the pulse repetition frequency must enable the generated enable pulses to activate the light-emitting diodes 3, 4 frequently enough to unerringly detect the presence of a light transmissive section of chopper disk 1 as the chopper disk 1 is rotated by the user. The enable pulse duration is selected to provide sufficient time for the light-emitting diodes 3, 4 to generate the beam of light A, B and for the corresponding light detector 5, 6 to sense the presence or absence of the generated beam of light A, B. The output of the light detectors 5, 6 are applied to the input terminals of Schmidt trigger circuits 5S, 6S to produce a logic signal output once the light detector output exceeds a predetermined threshold. A predetermined delay is imposed by control circuit 7 on the sampling of the light detector outputs, as represented by the Schmidt trigger outputs, to ensure that the device pair of light-emitting diode 3, 4 and light detector 5, 6 has had sufficient time to reach stable operation before the output signal of the light detector 5, 6 is sampled. This delay ensures that switching transients have dissipated prior to producing a logical output. In addition, the Schmidt trigger circuits 5S, 6S include a certain amount of hysterisis, so that the output state of the Schmidt trigger circuit does not change from one logic state to the other until the input signal has passed a predetermined threshold. Therefore, the output of the Schmidt trigger does not change as soon as the input to the device changes, but is delayed.

Enable Pulse Characteristics

In a rotary pulsed optical encoder, the enable pulse width and enable pulse repetition frequency are determined by the switching times of the circuit elements and the desired data sampling rate. When the enable pulse is applied to the optical circuitry, the light emitting diode must first be driven to generate the light output. There is a minimum switching time for the light emitting diode to respond to the applied enable signal. In response to light emitting diodes 3, 4 transmitting a beam of light to the light detectors 5, 6, the detector (phototransistor) must turn on. As the phototransistor turns on, the output voltage it produces ramps up to the logic state indicative of a received light beam. There is a minimum output level for the phototransistor which ensures that erroneous logic states are not detected due to noise or transients present in the circuit. For the circuit illustrated in FIG. 2, the typical response time for a light emitting diode is 1 μsec and the rise time of the phototransistor is 6 μsec. In order to ensure that this circuit has reached a quiescent state, the minimum combined device response time is factored by a tolerance margin, such as 3 times the minimum combined device response time. Thus, in the present example, the sample is taken at 21 μsec after the enable pulse is applied to the light emitting device and the enable pulse is at least 21 μsec in duration.

Another variable to determine is the sample rate. The maximum sample rate is also determined by the switching time of the light emitting device and the light detector. Once the sample is taken at 21 μsec, the enable pulse is removed from the light emitting device and the light beam vanishes. The recovery time for the light detector to return to a quiescent state once the light beam is gone is typically 3 times the pulse width. Therefore, the maximum sampling rate is 1/(pulse width+device recovery time) or 1/(21 μsec+ 3*21 μsec)=1/84 μsec=12 KHz. The typical sample rate used in a monitoring device is 200 Hz due to the fact that a user cannot turn shaft 2 at a greater rate and additional sampling speed is extraneous. The control circuit 7 pulses the light-emitting diodes 3, 4 for a duration of approximately 20 μsec for each of the 200 samples per second. This results in the power applied to the light-emitting diodes 3, 4 being only 0.4% of the power that would be required if the light-emitting diodes 3, 4 were powered on a continuous basis.

Figure 5:
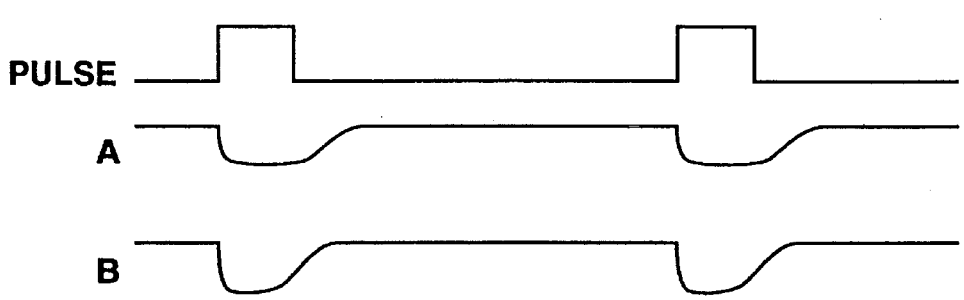
Figure 6:
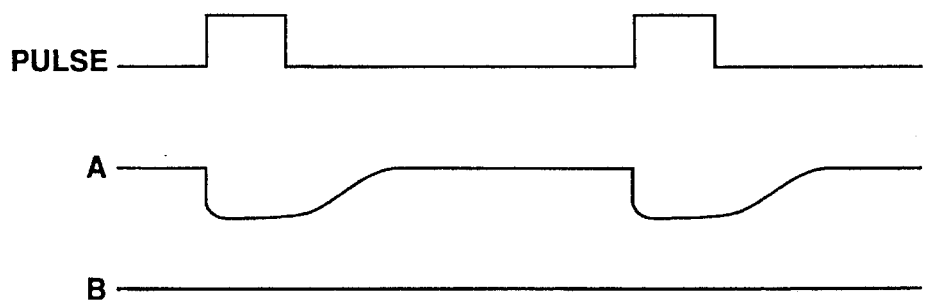
Figure 7:
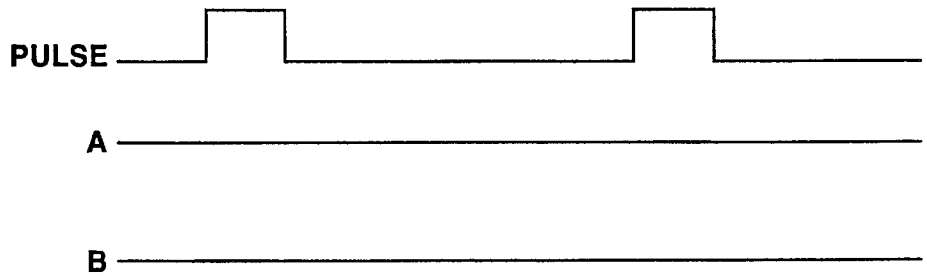
Figure 8:
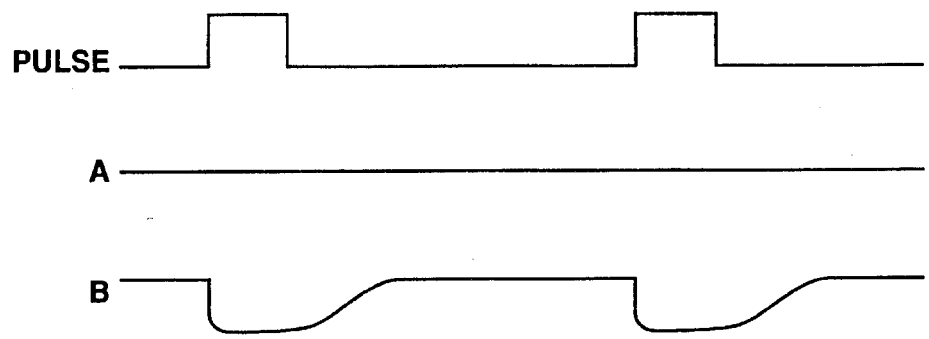

The waveform diagrams of FIGS. 5–8 illustrate the various states of the light detectors for various positions of the chopper disk 1, under the pulsed mode of operation of the optical rotary encoder. FIG. 5 illustrates the signals output from the light detectors 5, 6 when both light beams A and B are not blocked by the chopper disk 1. Since the sampling rate is far in excess of the speed of rotation of chopper disk 1, the state illustrated in FIG. 5 persists for a number of sampling intervals. As the chopper disk 1 rotates further, the light detector 6 turns off when the opaque section 10 of the chopper disk 1 blocks light beam B as shown in FIG. 6. The other light detector 5 turns off as shown in FIG. 7 when the chopper disk 1 is rotated to block both light beams A and B. Finally, the rotation of chopper disk 1 permits light beam B to pass to light detector 6, which turns on as the enable pulse is applied to light emitting device 4 by the drive circuit 7, as shown in FIG. 8.

SUMMARY

The pulsed optical rotary encoder digitally samples the operation of the optical rotary encoder to obtain the same information that is obtained by the use of the continuously active light-emitting devices but in a much more energy-efficient manner. In particular, the light-emitting devices are pulsed into operation for a short duration and at a frequent rate. The signals produced by the light detectors associated with the light-emitting devices are sampled at a predetermined time after firing the light-emitting devices to obtain the data necessary to determine the rotation of the chopper disk.

While a specific embodiment of the invention is disclosed herein, it is expected that those skilled in the art can create alternate embodiments of the invention which fall under the scope of the claims that are appended hereto. Therefore, the specific embodiment is simply illustrative of the concept of the invention and should not be construed as limiting the scope of the claims.

We claim:

1. Apparatus for determining a rotary a position of a shaft, comprising:

means for emitting two beams of light parallel to at least a portion of said shaft, and substantially juxtaposed to said shaft, comprising two light emitting devices;

means for receiving said emitted beams of light, comprising two light detectors, each receiving a light beam from a corresponding one of said two light-emitting devices;

means, attached to said shaft, rotating in synchronization therewith, for interrupting transmission of said emitted beams of light from said emitting means to said receiving means as a function of rotation of said shaft, comprising a disk-like structure having alternating sections of light transmissivity and light opacity to alternately pass and block each of said two light beams, as they emanate from each of said two light-emitting devices and are transmitted to each of said two light detectors, as said shaft is rotated, causing said alternating sections to pass through said light beams;

means, operationally independent of said rotation of said shaft, for enabling operation of said emitting means on a periodic basis; and means, responsive to a sequence of signals produced by said receiving means, indicative of alternating presence and absence of said light beams at said receiving means, for determining rotary position and direction of rotation of said shaft.

2. The apparatus of claim 1 further comprising:

means for sampling a signal produced by said receiving means, indicative of presence of said emitted beam of light, a predetermined time following enablement of said emitting means by said enabling means.

3. The apparatus of claim 1 wherein said enabling means comprises:

means for generating a series of periodically occurring pulses; and means for applying each said generated pulses to said emitting means to produce said beam of light for a duration determined by a duration of each of said generated pulses.

4. The apparatus of claim 1 further comprising:

detent means for mechanically determining a plurality of predetermined rotational positions of said shaft.

5. A method for determining a rotary a position of a shaft, comprising the steps of:

emitting two beams of light form a light emitting device parallel to at least a portion of said shaft, and substantially juxtaposed to said shaft, using two light emitting devices;

receiving said emitted beams of light at two light detectors, each receiving a light beam from a corresponding one of said two light emitting devices;

rotating an apparatus attached to said shaft, said apparatus comprising a disk-like structure having alternating sections of light transmissivity and light opacity to alternately pass and block each of said two light beams, as they emanate from each of said two light-emitting devices and are transmitted to each of said two light detectors, as said shaft is rotated, causing said alternating sections to pass through said light beams;

enabling operation of said light emitting device on a periodic basis; and determining rotary position and direction of rotation of said shaft in response to a sequence of signals produced by said light detectors, indicative of alternating presence and absence of said light beams at said light detectors.

6. The method of claim 5 further comprising the steps of:

sampling a signal produced by said light detector, indicative of presence of said emitted beam of light, a predetermined time following enablement of said light-emitting device.

7. The method of claim 5 wherein said step of enabling comprises:

generating a series of periodically occurring pulses; and applying each said generated pulses to said light-emitting device to produce said beam of light for a duration determined by a duration of each of said generated pulses.

8. The method of claim 5 further comprising the step of:

mechanically determining a plurality of predetermined rotational positions of said shaft.

* * * * *